(12) United States Patent
Kang et al.

(10) Patent No.: US 10,816,331 B2
(45) Date of Patent: Oct. 27, 2020

(54) SUPER-RESOLVING DEPTH MAP BY MOVING PATTERN PROJECTOR

(71) Applicant: Microsoft Technology Licensing, LLC, Redmond, WA (US)

(72) Inventors: Sing Bing Kang, Redmond, WA (US); Shahram Izadi, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/889,188

(22) Filed: Feb. 5, 2018

(65) Prior Publication Data

US 2018/0173947 A1 Jun. 21, 2018

Related U.S. Application Data

(63) Continuation of application No. 13/924,485, filed on Jun. 21, 2013, now Pat. No. 9,922,249.

(Continued)

(51) Int. Cl.
*G01B 11/25* (2006.01)
*H04N 5/33* (2006.01)
(Continued)

(52) U.S. Cl.
CPC .......... *G01B 11/2513* (2013.01); *G01B 11/22* (2013.01); *G01B 11/25* (2013.01); *G01B 11/2527* (2013.01); *G01B 11/2545* (2013.01); *G02B 5/1895* (2013.01); *G02B 27/4205* (2013.01); *G02B 27/44* (2013.01); *G06F 3/0653* (2013.01); *G06F 3/0659* (2013.01); *G06F 3/0683* (2013.01); *G06F 9/3004* (2013.01); *G06F 9/30043* (2013.01); *G06F 9/30127* (2013.01); *G06F 11/3024* (2013.01); *G06F 12/00* (2013.01); *G06F 12/02* (2013.01); *G06F 12/0207* (2013.01); *G06F 12/0292* (2013.01); *G06K 9/0063* (2013.01);
(Continued)

(58) Field of Classification Search
CPC ...................................................... G06T 15/60
USPC ...................................................... 348/42–60
See application file for complete search history.

(56) References Cited

U.S. PATENT DOCUMENTS 3,938,102 A 2/1976 Morrin et al.
5,351,152 A 9/1994 Kuo et al.
(Continued)

FOREIGN PATENT DOCUMENTS

CN 1244008 A 2/2000
CN 1414412 A 4/2003
(Continued)

OTHER PUBLICATIONS

"Non Final Office Action Issued In U.S. Appl. No. 15/912,555", dated Apr. 18, 2019, 16 Pages.
(Continued)

*Primary Examiner* — Collin X Beatty

(57) ABSTRACT

The subject disclosure is directed towards active depth sensing based upon moving a projector or projector component to project a moving light pattern into a scene. Via the moving light pattern captured over a set of frames, e.g., by a stereo camera system, and estimating light intensity at sub-pixel locations in each stereo frame, higher resolution depth information at a sub-pixel level may be computed than is captured by the native camera resolution.

20 Claims, 8 Drawing Sheets

Related U.S. Application Data

(60) Provisional application No. 61/812,232, filed on Apr. 15, 2013.

(51) Int. Cl.

| | | |
|---|---|---|
| *G06K 9/62* | (2006.01) | |
| *G06F 11/30* | (2006.01) | |
| *G06F 3/06* | (2006.01) | |
| *G06F 9/30* | (2018.01) | |
| *G06F 12/02* | (2006.01) | |
| *G06F 12/00* | (2006.01) | |
| *H04N 13/128* | (2018.01) | |
| *H04N 13/25* | (2018.01) | |
| *H04N 13/254* | (2018.01) | |
| *H04N 13/271* | (2018.01) | |
| *G06T 7/586* | (2017.01) | |
| *H04N 5/225* | (2006.01) | |
| *H04N 9/04* | (2006.01) | |
| *H04N 17/00* | (2006.01) | |
| *G06T 1/60* | (2006.01) | |
| *H04N 13/239* | (2018.01) | |
| *G02B 27/42* | (2006.01) | |
| *G06K 9/00* | (2006.01) | |
| *G02B 5/18* | (2006.01) | |
| *G02B 27/44* | (2006.01) | |
| *G01B 11/22* | (2006.01) | |
| *G06T 7/00* | (2017.01) | |
| *H04N 13/00* | (2018.01) | |
| *A63F 13/213* | (2014.01) | |

(52) U.S. Cl.
CPC ..... *G06K 9/00201* (2013.01); *G06K 9/00536* (2013.01); *G06K 9/62* (2013.01); *G06T 1/60* (2013.01); *G06T 7/00* (2013.01); *G06T 7/586* (2017.01); *H04N 5/2256* (2013.01); *H04N 5/33* (2013.01); *H04N 5/332* (2013.01); *H04N 9/045* (2013.01); *H04N 13/128* (2018.05); *H04N 13/239* (2018.05); *H04N 13/25* (2018.05); *H04N 13/254* (2018.05); *H04N 13/271* (2018.05); *H04N 17/002* (2013.01); *A63F 13/213* (2014.09); *G02B 27/4233* (2013.01); *G06T 2207/30244* (2013.01); *H04N 2013/0081* (2013.01)

(56) References Cited

U.S. PATENT DOCUMENTS

| | | |
|---|---|---|
| 5,471,326 A | 11/1995 | Hall et al. |
| 5,586,200 A | 12/1996 | Devaney et al. |
| 5,739,906 A | 4/1998 | Evans et al. |
| 6,105,139 A | 8/2000 | Dey et al. |
| 6,751,344 B1 | 6/2004 | Grumbine |
| 7,315,383 B1 | 1/2008 | Abdollahi |
| 7,512,262 B2 | 3/2009 | Criminisi et al. |
| 7,565,003 B2 | 7/2009 | Ashizaki et al. |
| 7,634,395 B2 | 12/2009 | Flandrin et al. |
| 8,077,034 B2 | 12/2011 | Borlez et al. |
| 8,331,654 B2 | 12/2012 | Abraham et al. |
| 8,442,940 B1 | 5/2013 | Faletti et al. |
| 8,787,656 B2 | 7/2014 | Park et al. |
| 8,818,077 B2 | 8/2014 | Hwang |
| 9,508,003 B2 | 11/2016 | Eguro et al. |
| 9,697,424 B2 | 7/2017 | Kirk et al. |
| 9,760,770 B2 | 9/2017 | Eguro et al. |
| 9,928,420 B2 | 3/2018 | Kirk et al. |
| 9,959,465 B2 | 5/2018 | Georgiou et al. |
| 2002/0136444 A1 | 9/2002 | Brown et al. |
| 2003/0043270 A1 | 3/2003 | Rafey et al. |
| 2003/0048459 A1 | 3/2003 | Gooch |
| 2003/0081833 A1 | 5/2003 | Tilton |
| 2004/0105580 A1 | 6/2004 | Hager et al. |
| 2004/0125222 A1 | 7/2004 | Bradski et al. |
| 2004/0201586 A1 | 10/2004 | Marschner et al. |
| 2005/0058362 A1 | 3/2005 | Kita |
| 2005/0234527 A1 | 10/2005 | Slatkine |
| 2005/0257748 A1 | 11/2005 | Kriesel et al. |
| 2005/0279172 A1 | 12/2005 | Schreier et al. |
| 2006/0176306 A1 | 8/2006 | Nagaraj et al. |
| 2006/0210146 A1 | 9/2006 | Gu |
| 2006/0238714 A1 | 10/2006 | Fox et al. |
| 2006/0291020 A1 | 12/2006 | Knox et al. |
| 2007/0009150 A1 | 1/2007 | Suwa et al. |
| 2007/0145273 A1 | 6/2007 | Chang |
| 2007/0146512 A1 | 6/2007 | Suzuki et al. |
| 2007/0183657 A1 | 8/2007 | Kidono et al. |
| 2007/0253310 A1 | 11/2007 | Ikenaka |
| 2007/0263903 A1 | 11/2007 | St. hilaire et al. |
| 2008/0118143 A1 | 5/2008 | Gordon et al. |
| 2008/0130015 A1 | 6/2008 | Lu |
| 2008/0165357 A1 | 7/2008 | Stern et al. |
| 2008/0187711 A1 | 8/2008 | Alam et al. |
| 2008/0205748 A1 | 8/2008 | Lee et al. |
| 2008/0218612 A1 | 9/2008 | Border et al. |
| 2008/0278570 A1 | 11/2008 | Gharib et al. |
| 2008/0283729 A1 | 11/2008 | Hosaka |
| 2009/0021750 A1 | 1/2009 | Korner et al. |
| 2009/0080048 A1 | 3/2009 | Tsao |
| 2009/0096783 A1 | 4/2009 | Shpunt et al. |
| 2009/0217213 A1 | 8/2009 | Meserve |
| 2009/0217214 A1 | 8/2009 | Meserve |
| 2009/0231425 A1 | 9/2009 | Zalewski |
| 2009/0273679 A1 | 11/2009 | Gere et al. |
| 2010/0042964 A1 | 2/2010 | Meserve |
| 2010/0046004 A1 | 2/2010 | Lee et al. |
| 2010/0074532 A1 | 3/2010 | Gordon et al. |
| 2010/0177164 A1 | 7/2010 | Zalevsky et al. |
| 2010/0202725 A1 | 8/2010 | Popovich et al. |
| 2010/0277571 A1 | 11/2010 | Xu et al. |
| 2010/0289885 A1 | 11/2010 | Lu et al. |
| 2011/0025827 A1 | 2/2011 | Shpunt et al. |
| 2011/0063427 A1 | 3/2011 | Fengler et al. |
| 2011/0078189 A1 | 3/2011 | Bonchi et al. |
| 2011/0080487 A1 | 4/2011 | Venkataraman et al. |
| 2011/0091096 A1 | 4/2011 | Morris et al. |
| 2011/0103711 A1 | 5/2011 | Su et al. |
| 2011/0149031 A1 | 6/2011 | Um et al. |
| 2011/0222757 A1 | 9/2011 | Yeatman et al. |
| 2011/0228097 A1 | 9/2011 | Motta |
| 2011/0310220 A1 | 12/2011 | Mceldowney |
| 2012/0002045 A1 | 1/2012 | Tony et al. |
| 2012/0025080 A1 | 2/2012 | Liu et al. |
| 2012/0038986 A1 | 2/2012 | Pesach |
| 2012/0056982 A1* | 3/2012 | Katz ..................... G06T 7/521 348/43 |
| 2012/0087572 A1 | 4/2012 | Dedeoglu et al. |
| 2012/0120494 A1 | 5/2012 | Takayama |
| 2012/0154397 A1 | 6/2012 | Chernikov et al. |
| 2012/0155747 A1 | 6/2012 | Hwang |
| 2012/0242829 A1 | 9/2012 | Shin et al. |
| 2012/0253201 A1 | 10/2012 | Reinhold |
| 2012/0281087 A1 | 11/2012 | Kruse |
| 2012/0294510 A1 | 11/2012 | Zhang et al. |
| 2012/0307075 A1 | 12/2012 | Margalit |
| 2013/0002814 A1 | 1/2013 | Park et al. |
| 2013/0003069 A1 | 1/2013 | Umeda et al. |
| 2013/0051657 A1 | 2/2013 | Ostermann et al. |
| 2013/0083062 A1 | 4/2013 | Geisner et al. |
| 2013/0095302 A1 | 4/2013 | Pettis et al. |
| 2013/0100256 A1 | 4/2013 | Kirk et al. |
| 2013/0100282 A1 | 4/2013 | Siercks |
| 2013/0141545 A1 | 6/2013 | Macchia et al. |
| 2013/0141611 A1 | 6/2013 | Hirai et al. |
| 2013/0215235 A1 | 8/2013 | Russell |
| 2013/0229396 A1 | 9/2013 | Huebner |
| 2013/0265623 A1 | 10/2013 | Sugiyama et al. |
| 2013/0278631 A1 | 10/2013 | Border et al. |
| 2013/0287291 A1 | 10/2013 | Cho |
| 2013/0335531 A1 | 12/2013 | Lee et al. |

(56) References Cited

U.S. PATENT DOCUMENTS

| | | |
|---|---|---|
| 2014/0055560 A1 | 2/2014 | Fu et al. |
| 2014/0098342 A1 | 4/2014 | Webb |
| 2014/0104387 A1 | 4/2014 | Klusza et al. |
| 2014/0112573 A1 | 4/2014 | Francis et al. |
| 2014/0120319 A1 | 5/2014 | Joseph |
| 2014/0132501 A1 | 5/2014 | Choi et al. |
| 2014/0132728 A1 | 5/2014 | Verano et al. |
| 2014/0139717 A1 | 5/2014 | Short |
| 2014/0168380 A1 | 6/2014 | Heidemann et al. |
| 2014/0180639 A1 | 6/2014 | Cheatham et al. |
| 2014/0184584 A1 | 7/2014 | Reif et al. |
| 2014/0206443 A1 | 7/2014 | Sharp et al. |
| 2014/0225985 A1 | 8/2014 | Klusza et al. |
| 2014/0225988 A1 | 8/2014 | Poropat |
| 2014/0241612 A1 | 8/2014 | Rhemann et al. |
| 2014/0293011 A1 | 10/2014 | Lohry et al. |
| 2014/0307047 A1 | 10/2014 | Kirk et al. |
| 2014/0307055 A1 | 10/2014 | Kang et al. |
| 2014/0307058 A1 | 10/2014 | Kirk et al. |
| 2014/0307098 A1 | 10/2014 | Kang et al. |
| 2014/0307307 A1 | 10/2014 | Georgiou et al. |
| 2014/0307952 A1 | 10/2014 | Sweeney et al. |
| 2014/0307953 A1 | 10/2014 | Kirk et al. |
| 2014/0309764 A1 | 10/2014 | Socha-Ieialoha et al. |
| 2014/0310496 A1 | 10/2014 | Eguro et al. |
| 2014/0320605 A1 | 10/2014 | Johnson |
| 2014/0354803 A1 | 12/2014 | Chida |
| 2015/0078672 A1 | 3/2015 | Eguro et al. |
| 2015/0316368 A1 | 11/2015 | Moench et al. |
| 2017/0116757 A1 | 4/2017 | Shpunt et al. |
| 2018/0218210 A1 | 8/2018 | Georgiou et al. |
| 2018/0260623 A1 | 9/2018 | Kang et al. |

FOREIGN PATENT DOCUMENTS

| | | |
|---|---|---|
| CN | 1414420 A | 4/2003 |
| CN | 1445724 A | 10/2003 |
| CN | 1541483 A | 10/2004 |
| CN | 1669051 A | 9/2005 |
| CN | 1735789 A | 2/2006 |
| CN | 101061367 A | 10/2007 |
| CN | 101124514 A | 2/2008 |
| CN | 101309429 A | 11/2008 |
| CN | 101443809 A | 5/2009 |
| CN | 101501442 A | 8/2009 |
| CN | 101509764 A | 8/2009 |
| CN | 101711354 A | 5/2010 |
| CN | 101878409 A | 11/2010 |
| CN | 102027434 A | 4/2011 |
| CN | 102036599 A | 4/2011 |
| CN | 102231037 A | 11/2011 |
| CN | 102362150 A | 2/2012 |
| CN | 102385237 A | 3/2012 |
| CN | 102572485 A | 7/2012 |
| CN | 102638692 A | 8/2012 |
| CN | 102760234 A | 10/2012 |
| CN | 102803894 A | 11/2012 |
| CN | 102831380 A | 12/2012 |
| CN | 102867328 A | 1/2013 |
| CN | 103308517 A | 9/2013 |
| EP | 0085210 A1 | 8/1983 |
| EP | 2295932 A1 | 3/2011 |
| EP | 2400261 A1 | 12/2011 |
| GB | 2481459 A | 12/2011 |
| JP | 2000341721 A | 12/2000 |
| JP | 2003058911 A | 2/2003 |
| JP | 2004135209 A | 4/2004 |
| JP | 2005341470 A | 12/2005 |
| JP | 2006229802 A | 8/2006 |
| JP | 2009014501 A | 1/2009 |
| JP | 2010011223 A | 1/2010 |
| JP | 2010504522 A | 2/2010 |
| JP | 2010145186 A | 7/2010 |
| JP | 2011514232 A | 5/2011 |
| JP | 2013544449 A | 12/2013 |
| KR | 20110046222 A | 5/2011 |
| KR | 20110132260 A | 12/2011 |
| KR | 101137646 B1 | 4/2012 |
| RU | 2237284 C2 | 9/2004 |
| WO | 2006016303 A2 | 2/2006 |
| WO | 2007132399 A1 | 11/2007 |
| WO | 2009046268 A1 | 4/2009 |
| WO | 2012137434 A1 | 10/2012 |

OTHER PUBLICATIONS

"Notice On Reexamination Issued In Chinese Patent Application No. 201480021519.6", dated Mar. 29, 2019, 8 Pages.

"First Office Action and Search Report Issued in Chinese Patent Application No. 201480021460.0", dated Mar. 28, 2017, 17 Pages.

"Second Office Action Issued in Chinese Patent Application No. 201480021460.0", dated Dec. 11, 2017, 6 Pages.

"Third Office Action Issued in Chinese Patent Application No. 201480021460.0", dated Jul. 2, 2018, 7 Pages.

"Office Action Issued In Chinese Patent Application No. 201480021487.X", dated Jun. 20, 2018, 7 Pages.

"Office Action Issued in Chinese Patent Application No. 201480021493.5", dated Dec. 19, 2017, 12 Pages.

"Second Office Action Issued In Chinese Patent Application No. 201480021493.5", dated Aug. 15, 2018, 10 Pages.

"Office Action Issued In Chinese Patent Application No. 201480021519.6", dated Sep. 4, 2018, 10 Pages.

"First Office Action and Search Report Issued in Chinese Patent Application No. 201480021519.6", dated Aug. 30, 2016, 18 Pages.

"Fourth Office Action Issued in Chinese Patent Application No. 201480021519.6", dated Mar. 8, 2018, 15 Pages.

"Office Action Issued in Chinese Patent Application No. 201480021519.6", dated Sep. 19, 2017, 14 Pages.

"Second Office Action and Search Report Issued in Chinese Patent Application No. 201480021519.6", dated Mar. 30, 2017, 17 Pages.

"First Office Action and Search Report Issued in Chinese Patent Application No. 201480021528.5", dated Dec. 11, 2017, 14 Pages.

"Second Office Action Issued In Chinese Patent Application No. 201480021528.5", dated Aug. 2, 2018, 8 Pages.

"First Office Action and Search Report Issued in Chinese Patent Application No. 201480021958.7", dated Oct. 18, 2017, 19 Pages.

"Second Office Action Issued In Chinese Patent Application No. 201480021958.7", dated Jun. 13, 2018, 16 Pages.

"Office Action Issued In Russian Patent Application No. 2015143654", dated Jan. 31, 2018, 8 Pages.

"Office Action Issued in Japanese Patent Application No. 2016-508993", dated Feb. 6, 2018, 5 Pages.

"Office Action Issued in Japanese Patent Application No. 2016-508993", dated Aug. 7, 2018, 5 Pages.

Anderson, et al., "The IBM System/360 Model 91: Machine Philosophy And Instruction-Handling", Published in IBM Journal of Research and Development, vol. 11, Issue 1, Jan. 1, 1967, pp. 8-24.

Chan, et al., "Regular Stereo Matching Improvement System Based On Kinect-Supporting Mechanism", In Open Journal of Applied Sciences, vol. 3, Issue 1, Mar. 30, 2013, 5 Pages.

Chihoub, et al., "A Band Processing Imaging Library For A Tricore-Based Digital Still Camera", In Research Article of Real-Time Imaging, vol. 7, Issue 4, Aug. 1, 2001, pp. 327-337.

Gao, et al., "Stereo Matching Algorithm Based On Illumination Normal Similarity and Adaptive Support Weight", In Optical Engineering, vol. 52, Issue 2, Feb. 2013, 8 Pages.

Gu, et al., "Trinocular Disparity Estimation With Adaptive Support Weight And Disparity Calibration", In Optical Engineering, vol. 47, Issue 3, Mar. 1, 2008, 5 Pages.

Hariyama, et al., "Optimal Periodical Memory Allocation For Logic-In-Memory Image Processors", In Proceedings Of the Emerging VLSI Technologies and Architectures (ISVLSI'06), Mar. 2, 2006, pp. 193-198.

Hosni, et al., "Near Real-Time Stereo With Adaptive Support Weight Approaches", In Proceedings of International Symposium 3D Data Processing, Visualization and Transmission, May 17, 2010, 8 Pages.

(56) References Cited

OTHER PUBLICATIONS

Kanade, et al., "Development Of A Video-Rate Stereo Machine", In Proceedings Of IEEE/RSJ International Conference on Intelligent Robots and Systems. Human Robot Interaction and Cooperative Robots, Aug. 5, 1995, pp. 95-100.
Kuon, et al., "FPGA Architecture: Survey And Challenges", In Foundations and Trends in Electronic Design Automation vol. 2, Issue 2, Apr. 18, 2008, pp. 135-253.
Langmann, et al., "Depth Camera Technology Comparison And Performance Evaluation", In Proceedings of the 1st International Conference on Pattern Recognition Applications and Methods, Feb. 2012, 7 Pages.
McIlroy, et al., "Kinectrack: Agile 6-DoF Tracking Using A Projected Dot Pattern", Published In IEEE International Symposium on Mixed and Augmented Reality (ISMAR), Nov. 5, 2012, 7 Pages.
"Office Action Issued in Mexican Patent Application No. MX/a/2015/014577", dated Nov. 10, 2017, 3 Pages.
"International Preliminary Report on Patentability Issued in PCT Application No. PCT/US2014/033909", dated Jun. 29, 2015, 17 Pages.
"International Search Report and Written Opinion Issued in PCT Application No. PCT/US2014/033909", dated Jul. 25, 2014, 16 Pages.
"Second Written Opinion Issued in PCT Application No. PCT/US2014/033909", dated Mar. 25, 2015, 14 Pages.
"International Preliminary Report on Patentability Issued in PCT Application No. PCT/US2014/033910", dated Jul. 24, 2015, 8 Pages.
"International Search Report and Written Opinion Issued in PCT Application No. PCT/US2014/033910", dated Jul. 25, 2014, 9 Pages.
"Second Written Opinion Issued In PCT Patent Application No. PCT/US2014/033910", dated Dec. 18, 2014, 5 Pages.
"International Preliminary Report on Patentability Issued in PCT Application No. PCT/US2014/033915", dated Apr. 7, 2015, 10 Pages.
"International Search Report and Written Opinion Issued in PCT Application No. PCT/US2014/033915", dated Jul. 16, 2014, 11 Pages.
"Second Written Opinion Issued in PCT Application No. PCT/US2014/033915", dated Jan. 8, 2015, 9 Pages.
"International Preliminary Report on Patentability Issued in PCT Patent Application No. PCT/US2014/033916", dated Jul. 13, 2015, 7 Pages.
"International Search Report and Written Opinion Issued in PCT Application No. PCT/US2014/033916", dated Jul. 18, 2014, 8 Pages.
"Second Written Opinion Issued in PCT Application No. PCT/US2014/033916", dated Mar. 27, 2015, 6 Pages.
"International Preliminary Report on Patentability Issued in PCT Patent Application No. PCT/US2014/033917", dated Jul. 20, 2015, 8 Pages.
"International Search Report and Written Opinion Issued in PCT Application No. PCT/US2014/033917", dated Jul. 18, 2014, 10 Pages.
"International Preliminary Report on Patentability Issued in PCT Patent Application No. PCT/US2014/033919", dated Jul. 13, 2015, 7 Pages.
"International Search Report & Written Opinion Issued In PCT Application No. PCT/US2014/033919", dated Jul. 17, 2014, 8 Pages.
"Second Written Opinion Issued In PCT Application No. PCT/US2014/033919", dated Mar. 27, 2015, 6 Pages.
"International Search Report Issued In PCT Patent Application No. PCT/US2014/033996", dated Jul. 31, 2014, 3 Pages.
Yamaguchi, et al., "Interleaved Pixel Lookup For Embedded Computer Vision", In Proceedings of IEEE Computer Society Conference on Computer Vision and Pattern Recognition Workshops, Jun. 23, 2008, pp. 1-8.

Yoon, et al., "Locally Adaptive Support-Weight Approach For Visual Correspondence Search", In Proceedings of IEEE Computer Society Conference on Computer Vision and Pattern Recognition, Jun. 20, 2005, 8 Pages.
"Third Office Action Issued in Chinese Patent Application No. 201480021958.7", dated Dec. 3, 2018, 10 Pages.
"Fourth Office Action Issued in Chinese Patent Application No. 201480021460.0", dated Jan. 24, 2019, 7 Pages.
"Third Office Action Issued in Chinese Patent Application No. 201480021493.5", dated Feb. 26, 2019, 10 Pages.
"Third Office Action Issued in Chinese Patent Application No. 201480021528.5", dated Feb. 11, 2019, 9 Pages.
"Office Action Issued in European Patent Application No. 14724942.9", dated Oct. 21, 2019, 8 Pages.
"Office Action Issued in European Patent Application No. 14725312.4", dated Oct. 9, 2019, 5 Pages.
"Office Action Issued in European Patent Application No. 14727992.1", dated Oct. 9, 2019, 8 Pages.
Schuon, et al., "High-Quality Scanning Using Time-Of-Flight Depth Superresolution", In Proceedings of IEEE Computer Society Conference on Computer Vision and Pattern Recognition Workshops, Jun. 23, 2008, 7 Pages.
"Decision on Rejection Issued In Chinese Patent Application No. 201480021493.5", dated Aug. 21, 2019, 6 Pages.
"Office Action Issued in Indian Patent Application No. 6032/CHENP/2015", dated Aug. 13, 2019, 6 Pages.
"Office Action Issued in European Patent Application No. 14724934.6", dated Oct. 24, 2019, 8 Pages.
"Office Action Issued in Chinese Patent Application No. 201480021422.5", dated Nov. 12, 2019, 6 Pages.
"Office Action Issued in European Patent Application No. 14725861.0", dated Nov. 8, 2019, 5 Pages.
"Final Office Action Issued in U.S. Appl. No. 15/912,555", dated Oct. 8, 2019, 15 Pages.
"Third Office Action Issued in Chinese Patent Application No. 201480021487.X", dated Feb. 28, 2020, 18 Pages.
"Office Action Issued in Indian Patent Application No. 6362/CHENP/2015", dated Feb. 26, 2020, 6 Pages.
"Non Final Office Action Issued In U.S. Appl. No. 15/912,555", dated Feb. 7, 2020, 17 Pages.
"Office Action Issued in European Patent Application No. 14726261.2", dated Nov. 29, 2019, 8 Pages.
"Non Final Office Action Issued in U.S. Appl. No. 15/937,851", dated Dec. 23, 2019, 14 Pages.
"Final Office Action Issued in U.S. Appl. No. 13/915,622", dated Jan. 21, 2016, 28 Pages.
"Final Office Action Issued in U.S. Appl. No. 13/915,622", dated Mar. 7, 2017, 28 Pages.
"Final Office Action Issued in U.S. Appl. No. 13/915,622", dated Mar. 9, 2018, 28 Pages.
"Non Final Office Action Issued in U.S. Appl. No. 13/915,622", dated Aug. 5, 2016, 39 Pages.
"Non Final Office Action Issued in U.S. Appl. No. 13/915,622", dated Sep. 2, 2015, 28 Pages.
"Non Final Office Action Issued in U.S. Appl. No. 13/915,622", dated Aug. 15, 2017, 27 pages.
"Final Office Action Issued in U.S. Appl. No. 13/915,626", dated Mar. 28, 2017, 17 Pages.
"Final Office Action Issued in U.S. Appl. No. 13/915,626", dated Jul. 11, 2016, 13 Pages.
"Non Final Office Action Issued in U.S. Appl. No. 13/915,626", dated Dec. 9, 2016, 16 Pages.
"Non Final Office Action Issued in U.S. Appl. No. 13/915,626", dated Jan. 29, 2016, 17 Pages.
"Final Office Action Issued in U.S. Appl. No. 13/918,892", dated Nov. 19, 2015, 7 Pages.
"Final Office Action Issued in U.S. Appl. No. 13/918,892", dated Dec. 21, 2016, 6 Pages.
"Non Final Office Action Issued in U.S. Appl. No. 13/918,892", dated Mar. 28, 2016, 6 Pages.
"Non Final Office Action Issued in U.S. Appl. No. 13/918,892", dated May 11, 2015, 6 Pages.

(56) References Cited

OTHER PUBLICATIONS

"Final Office Action Issued in U.S. Appl. No. 13/923,135", dated Oct. 3, 2016, 15 Pages.
"Final Office Action Issued in U.S. Appl. No. 13/923,135", dated Jul. 27, 2015, 21 Pages.
"Non Final Office Action Issued in U.S. Appl. No. 13/923,135", dated Mar. 31, 2016, 14 Pages.
"Non Final Office Action Issued in U.S. Appl. No. 13/923,135", dated May 5, 2017, 17 Pages.
"Non Final Office Action Issued in U.S. Appl. No. 13/923,135", dated Dec. 19, 2014, 13 Pages.
"Final Office Action Issued in U.S. Appl. No. 13/924,464", dated Sep. 15, 2016, 25 Pages.
"Final Office Action Issued in U.S. Appl. No. 13/924,464", dated Dec. 17, 2015, 25 Pages.
"Final Office Action Issued in U.S. Appl. No. 13/924,464", dated Sep. 27, 2017, 37 Pages.
"Non Final Office Action Issued in U.S. Appl. No. 13/924,464", dated Aug. 10, 2015, 20 Pages.
"Non Final Office Action Issued in U.S. Appl. No. 13/924,464", dated May 17, 2016, 26 Pages.
"Non Final Office Action Issued in U.S. Appl. No. 13/924,464", dated May 5, 2017, 38 Pages.
"Final Office Action Issued in U.S. Appl. No. 13/924,475", dated May 6, 2016, 13 Pages.
"Non Final Office Action Issued in U.S. Appl. No. 13/924,475", dated Sep. 8, 2016, 15 Pages.
"Non Final Office Action Issued in U.S. Appl. No. 13/924,475", dated Mar. 24, 2015, 17 Pages.
"Non Final Office Action Issued in U.S. Appl. No. 13/924,475", dated Oct. 7, 2015, 14 Pages.
"Final Office Action Issued in U.S. Appl. No. 13/925,762", dated May 11, 2016, 22 Pages.
"Final Office Action Issued in U.S. Appl. No. 13/925,762", dated May 9, 2017, 26 Pages.
"Non Final Office Action Issued in U.S. Appl. No. 13/925,762", dated Oct. 3, 2016, 28 Pages.
"Non Final Office Action Issued in U.S. Appl. No. 13/925,762", dated Nov. 5, 2015, 13 Pages.
"Non Final Office Action Issued in U.S. Appl. No. 14/088,408", dated Sep. 29, 2016, 16 Pages.
"Final Office Action Issued in U.S. Appl. No. 14/253,696", dated Feb. 25, 2016, 23 Pages.
"Non Final Office Action Issued in U.S. Appl. No. 14/253,696", dated Sep. 10, 2015, 18 Pages.
"Notice of Allowance Issued in U.S. Appl. No. 14/253,696", dated Jul. 21, 2016, 17 Pages.
"Office Action Issued in European Patent Application No. 14723271.4", dated Sep. 19, 2016, 9 Pages.
"Office Action Issued in European Patent Application No. 14723271.4", dated Jun. 29, 2017, 12 Pages.
"Oral Hearing Issued in European Patent Application No. 14723271.4", dated Mar. 29, 2018, 16 Pages.

"Office Action Issued in Australian Patent Application No. 2014254219", dated Apr. 19, 2017, 3 Pages.
"First Office Action and Search Report Issued in Chinese Patent Application No. 201480021199.4", dated May 31, 2017, 17 Pages.
"Second Office Action Issued in Chinese Patent Application No. 201480021199.4", dated Jan. 17, 2018, 7 Pages.
"Third Office Action Issued in Chinese Patent Application No. 201480021199.4", dated Jun. 19, 2018, 13 Pages.
"Office Action Issued In Chinese Patent Application No. 201480021422.5", dated Jul. 5, 2018, 10 Pages.
"First Office Action & Search Report Issued in Chinese Patent Application No. 201480021422.5", dated Mar. 21, 2017, 16 Pages.
"Second Office Action Issued in Chinese Patent Application No. 201480021422.5", dated Dec. 11, 2017, 14 Pages.
"Connected component (Graph Theory)", Retrieved From: https://en.wikipedia.org/w/index.php?title=Connected_component_(graph_theory)&oldid=841872370, May 18, 2018, 3 Pages.
"Final Office Action Issued in U.S Appl. No. 13/924,485", dated Sep. 13, 2016, 16 Pages.
"Final Office Action Issued in U.S. Appl. No. 13/924,485", dated Jul. 20, 2017, 16 Pages.
"Non Final office Action issued in U.S. Appl. No. 13/924,485", dated Dec. 15, 2015, 15 Pages.
"Non-Final Office Action Issued in U.S. Appl. No. 13/924,485", dated Mar. 7, 2017, 16 Pages.
"Notice of Allowance Issued in U.S. Appl. No. 13/924,485", dated Nov. 2, 2017, 8 Pages.
"Office Action Issued in Chinese Application No. 201480021487.X", dated Apr. 21, 2017, 13 Pages.
"Second Office Action Issued in Chinese Patent Application No. 201480021487.X", dated Dec. 15, 2017, 10 Pages.
"International Preliminary Report on Patentability Issued in PCT Patent Application No. PCT/US2014/033911", dated Jul. 13, 2015, 6 Pages.
"International Search Report & Written Opinion Issued in PCT Application No. PCT/US2014/033911", dated Aug. 29, 2014, 8 Pages.
"Second Written Opinion Issued in PCT Application No. PCT/US2014/033911", dated Apr. 2, 2015, 5 Pages.
Yang, et al. "Spatial-Depth Super Resolution for Range Images", In Proceedings of the IEEE Conference on Computer Vision and Pattern Recognition, Jun. 1, 2007, 8 Pages.
"Notice of Allowance Issued in Korean Patent Application No. 10-2015-7032651", dated Apr. 13, 2020, 4 Pages.
"Office Action Issued in Korean Patent Application No. 10-2015-7032633", dated Apr. 29, 2020, 8 Pages.
"Final Office Action Issued in U.S. Appl. No. 15/912,555", dated Jun. 10, 2020, 16 Pages.
"Final Office Action Issued in U.S. Appl. No. 15/937,851", dated Jul. 28, 2020, 10 Pages.
"Office Action Issued in European Patent Application No. 14724942.9", dated Jul. 27, 2020, 7 Pages.

* cited by examiner

SUPER-RESOLVING DEPTH MAP BY MOVING PATTERN PROJECTOR

CROSS-REFERENCE TO RELATED APPLICATION

The present application is a continuation of U.S. Non-provisional patent application Ser. No. 13/924,485, filed Jun. 21, 2013, which claims priority to U.S. provisional patent application Ser. No. 61/812,232, filed Apr. 15, 2013.

BACKGROUND

In active depth sensing, such as used by active rangefinders or active stereo systems, a projector projects patterns of light such as dots or lines to illuminate a region being sensed. The projected patterns are then captured by a camera/sensor (two or more in stereo systems), with the image (or images) processed to compute a depth map or the like.

For example, in stereo systems, stereo cameras capture two images from different viewpoints. Then, for example, one way to perform depth estimation with a stereo pair of images is to find correspondences between the images, e.g., to correlate each projected and sensed dot in one image with a counterpart dot in the other image via patch matching. For example, a dense depth map at the original (native) camera resolution may be obtained by area matching (e.g., a window of size 5×5). Once matched, the projected patterns within the images may be correlated with one another, and disparities between one or more features of the correlated dots (e.g., including their intensities) used to estimate a depth to that particular dot pair.

However, the resolution of the depth map is limited by the camera resolution.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more of various aspects of the subject matter described herein are directed towards moving a projector or projector component to project a light pattern into a scene. The moving causes the light pattern to move over time relative to the scene. Images of the scene captured at different times are used for depth sensing.

One or more aspects are directed towards computing a depth map having a higher resolution than a native sensor resolution. A moving pattern of light is projected into a scene, and a sensor set comprising one or more sensors captures a plurality of images at different times. By processing the images, computed depth data is obtained for sub-pixels based upon which sub-pixel locations were in a path corresponding to the moving pattern of light. Depth data for any sub-pixels for which computed depth data is not obtained is estimated. A depth map comprising depth data for each sub-pixel is output.

In one or more aspects, a projector is configured to project a light pattern towards a scene, and a sensor set comprising senses light from the light pattern that is reflected from the scene. A motion mechanism coupled to the projector moves the light pattern over time. An image processing subsystem processes images captured over time in which the light pattern has moved within the images to compute a depth map.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards increasing the native resolution of a depth map by using a moving (e.g., slightly vibrating) pattern projector, such as moved by coupling the projector to a small piezoelectric motor. By tracking the path of features in the images over a series of frames and associating patterns across cameras (or from projector to camera), higher resolution depth information can be achieved.

The technology may be used in the context of an active stereo system, such as where a pair of IR cameras are used in conjunction with an IR projector to provide texture for matching, and hence depth estimation. The technology may be based upon an accurate two-dimensional (2D) feature detector that is repeatable (e.g., including a peak detector for a dot pattern). By vibrating the pattern projector, the 2D features cover a number of sub-pixel positions, which are used for reconstructing an upsampled version of the native resolution of the system.

It should be understood that any of the examples herein are non-limiting. As such, the present invention is not limited to any particular embodiments, aspects, concepts, structures, functionalities or examples described herein.

Rather, any of the embodiments, aspects, concepts, structures, functionalities or examples described herein are non-limiting, and the present invention may be used various ways that provide benefits and advantages in active depth sensing and image processing in general.

Figure 1:
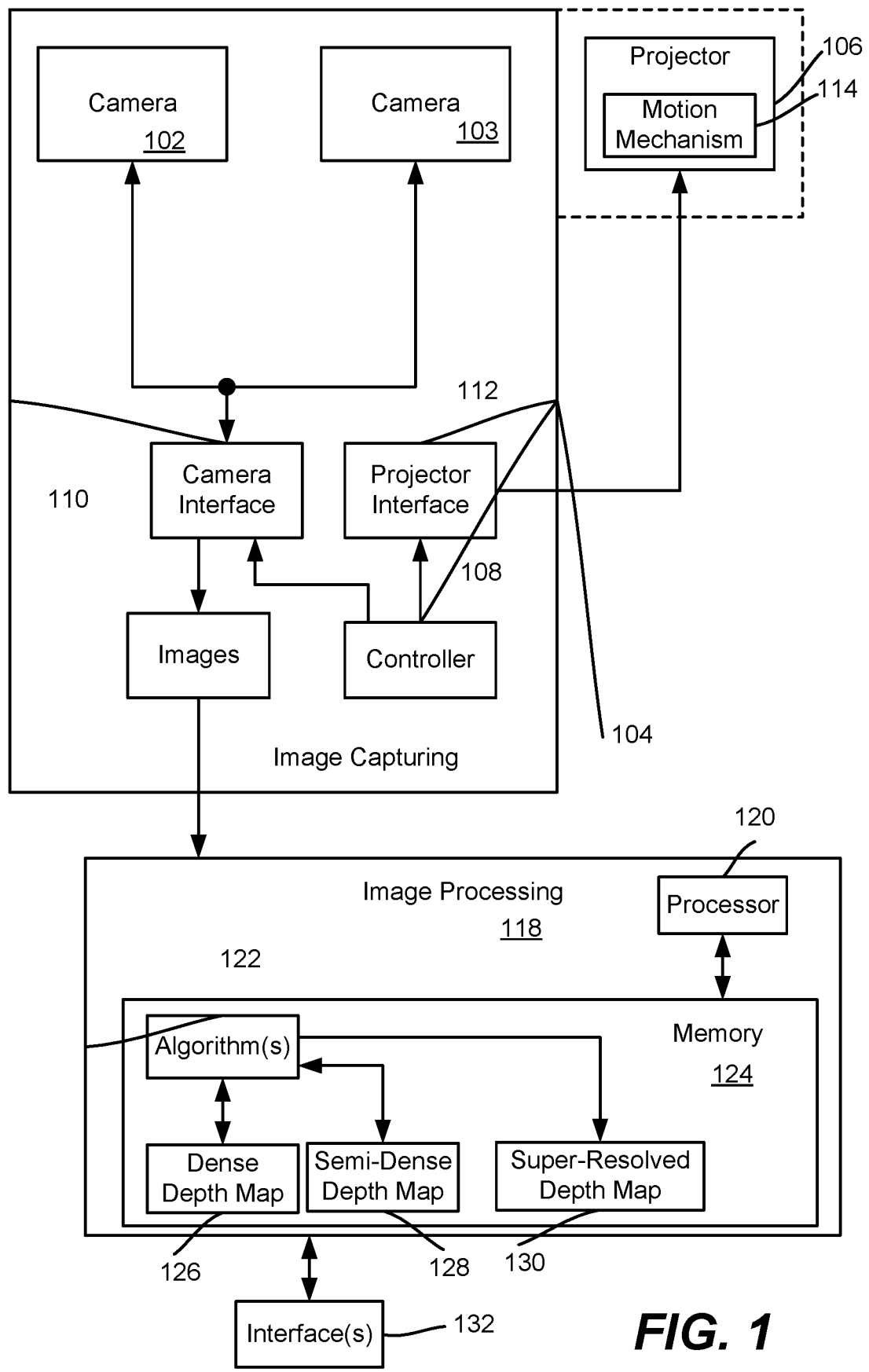
FIG. 1 is a block diagram representing example components that may be used to compute a depth map at a higher resolution than camera resolution, according to one or more example implementations.

FIG. 1 shows an example system in which stereo cameras 102 and 103 of an image capturing system or subsystem 104 capture images synchronized in time (e.g., the cameras are "genlocked"). In one implementation the cameras capture infrared (IR) images, as IR does not affect the visible appearance of the scene (which is valuable in video conferencing and object modeling applications, for example). As can be readily appreciated, in some scenarios such as studio environments, more than two IR depth-sensing cameras may be present. Further, one or more other cameras may be present in a given system, such as RBG cameras, and such other cameras may be used to help correlate dot pairs in different stereo images, for example In FIG. 1, a projector 106 is shown that projects an IR pattern onto a scene, such as a pattern of spots (e.g., dots) or a line pattern, although other spot shapes and/or pattern types may be used. For purposes of brevity, dots are generally described hereinafter. By illuminating the scene with a relatively large number of distributed infrared dots, the cameras 102 and 103 capture texture data as part of the infrared image data.

Figure 2:
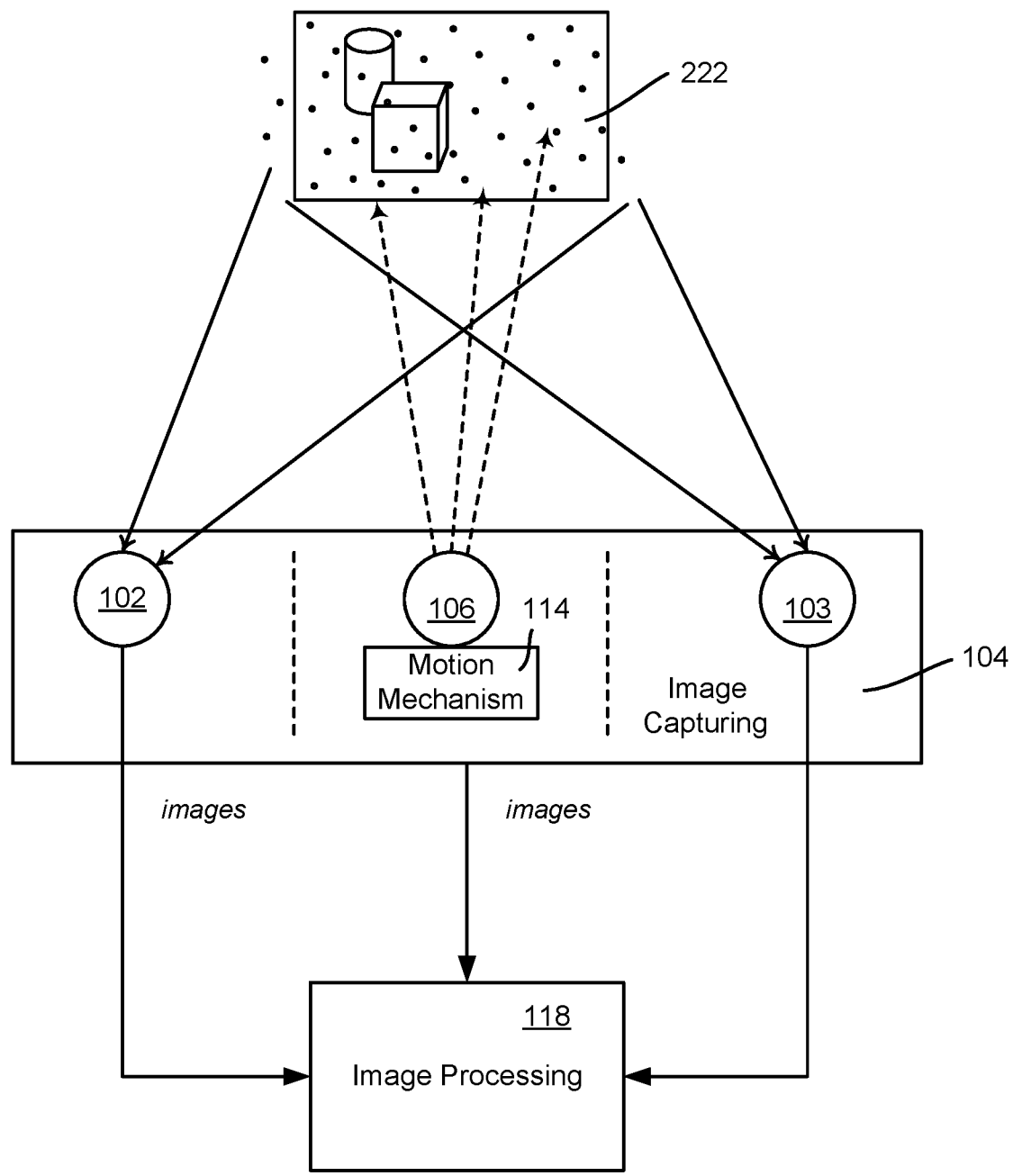
FIG. 2 is a representation of an example of projecting moving dots into a scene, according to one or more example implementations.

FIG. 2 exemplifies this projection concept. The projector 106, represented as a circle in between the stereo cameras 102 and 103, projects a dot pattern onto a scene 222. The cameras 102 and 103 capture the dots as they reflect off of object surfaces in the scene 222 and (possibly) the background. In general, one or more features of the captured dots is indicative of the distance to the reflective surface. Note that FIG. 2 is not intended to be to scale, nor convey any sizes, distance, dot distribution pattern, dot density and so on.

In one or more embodiments, the projector 106 may be configured to project dots to a region that is slightly larger than the scene 222 that the cameras 102 and 103 capture, because as described herein, the dots are not stationary whereby some dots not projected into the scene at one time may be projected into the scene at another time. More particularly, the projector is mechanically coupled to a motion mechanism 114, such as a small motor that vibrates the projector 106, causing the dot patterns move in a path over time. In FIG. 1, the projector 106 may be physically separate from the image capturing system or subsystem so that the vibration does not also jitter the cameras 102 and 103. If in the same device, the projector's movement may be dampened such as by positioning and/or the use vibration absorbing materials and the like so that the cameras do not overly shake.

In one alternative implementation, rather than shake the projector 106 or a component part thereof (e.g., a diffractive optical element that diffracts infrared laser light into the dot pattern), the projector 106 may project into a mirror system that is vibrated or otherwise moved. In this way, a mirror or the like, which may be much lighter and/or accessible and therefore more amenable to vibrating than a projector or a subcomponent thereof, may be used. Note that any such mirroring system that may be used, whether one mirror or more, is considered a component/part of the projector, even if only optically coupled to the projector and not physically coupled. Thus, as used herein, moving/vibrating the "projector" or "projector component" is the same as moving a mirror (or multiple mirrors) that reflectively project the light pattern.

Note that the placement of the projector 106 may be outside the cameras (e.g., FIG. 1), or in between the cameras (FIG. 2) or at another location, such as above or below one or both of the cameras. The examples herein are in no way limiting of where the cameras and/or projector are located relative to one another, and similarly, the cameras may be positioned at different positions relative to each other.

Returning to FIG. 1, in one implementation the example image capturing system or subsystem 104 includes a controller 108 that via a camera interface 110 controls the operation of the cameras 102 and 103. The exemplified controller via a projector interface 112 also controls the operation of the projector 106 and/or motion mechanism 114 that drives the projector movement (e.g., vibration). For example, the cameras 102 and 103 are synchronized (genlocked) to capture stereo images at the same time, such as by a controller signal (or different signals for each camera). The projector 106 may be turned on or off, pulsed, and otherwise have one or more parameters controllably varied to provide different output patterns, for example. The motion mechanism 114 may be turned on or off, or otherwise have one or more parameters controllably varied so as to change frequency, duty cycle, amplitude (e.g., to move dots in smaller or larger paths) and so on.

The images captured by the cameras 102 and 103 are provided to an image processing system or subsystem 118. In some implementations, the image processing system 118 and image capturing system or subsystem 104, or parts thereof, may be combined into a single device. For example a home entertainment device may include all of the components shown in FIG. 1 (as well as others not shown). In other implementations, parts (or all) of the image capturing system or subsystem 104, such as the cameras and projector with motion mechanism, may be a separate device that couples to a gaming console, personal computer, mobile device, dedicated processing device and/or the like. Indeed, a gaming console is exemplified below as one environment that may be used for processing images into depth data.

The image processing system or subsystem 118 includes a processor 120 and a memory 122 containing one or more image processing algorithms 124. A dense depth map 126 at the original camera resolution can be obtained through area-based matching, while a semi-dense depth map 128 can be extracted by matching features (such as dots and/or lines).

Described herein is an algorithm (FIG. 6) or the like that leverages the moving projected pattern to provide a "super-resolved" depth map 130 comprising a depth map having higher-resolution than the native resolution of the cameras. Also shown in FIG. 1 is an interface 132 to the image processing system or subsystem 118, such as for connecting a keyboard, game controller, display, pointing device microphone for speech commands and/or the like as appropriate for a user to interact with an application or the like that uses the super-resolved depth map.

As is known, such as described in U.S. published patent application no. 20130100256, hereby incorporated by reference, different dots or other projected elements have different features when captured, including intensity (brightness), depending on the distance from the projector to the reflective surfaces and/or the distance from the camera to the reflective surfaces. As is also known, the dots in different images taken at the same time (e.g., with genlocked stereo cameras) may be correlated with one another, such as by matching small (e.g., RGB) patches between RGB images of the same scene captured at the same instant.

Thus, with captured images, known algorithms can determine individual depth-related features (depth maps) for each image, and a disparity map that maintains differences between those images. The disparity map may be processed into a depth map based upon the disparity of certain features (e.g., intensity).

Figure 3:
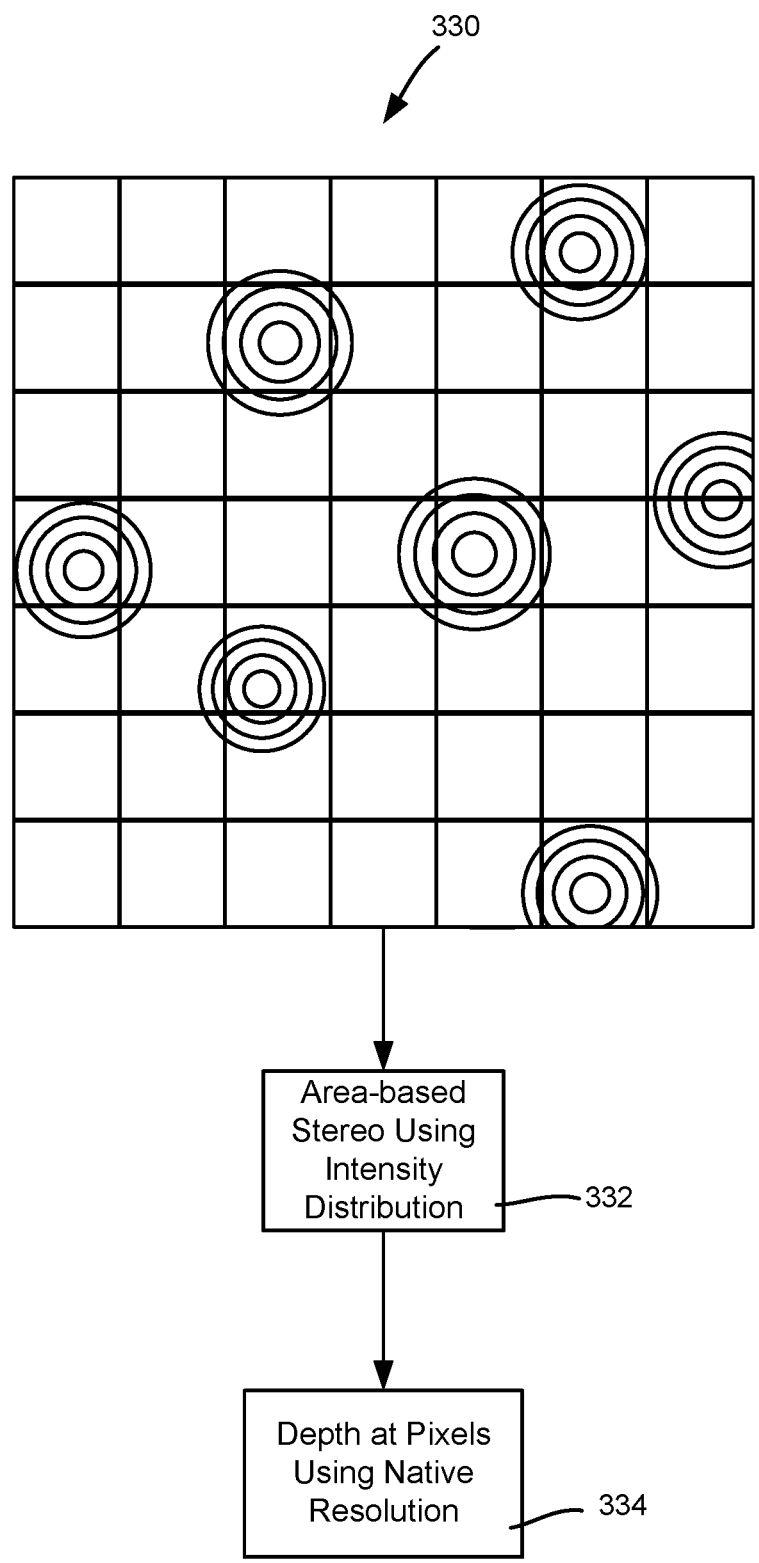
FIG. 3 is a representation of how projected dots may be captured in an example grid of image pixels, according to one or more example implementations.

FIG. 3 shows a small (7×7) grid 330 of pixels, from a portion of some larger example image. As generally represented in FIG. 3, the concentric circles represent captured dots projected on to a scene. To represent differing intensities for each dot, the smaller the circle, the greater the intensity. Thus, the center of the dot has the most intensity. In FIG. 3, the block 332 (area-based stereo using intensity distribution) gives a dense depth map 332, e.g., at each pixel in the native camera resolution). Further, note that in FIG. 3 the different diameters of the circles only suggest changes in intensity; the size of the circles and the grid squares are not intended to convey any particular scale, resolution, or the like, nor any particular intensity value or relative intensity values. Further, the density of the dots and/or their sizes or distribution are not intended to represent any actual density and/or distribution; however it is noted that the density, distribution and sizes of such dots are typically such that not every pixel is illuminated by a dot or even a portion of a dot.

Figure 4:
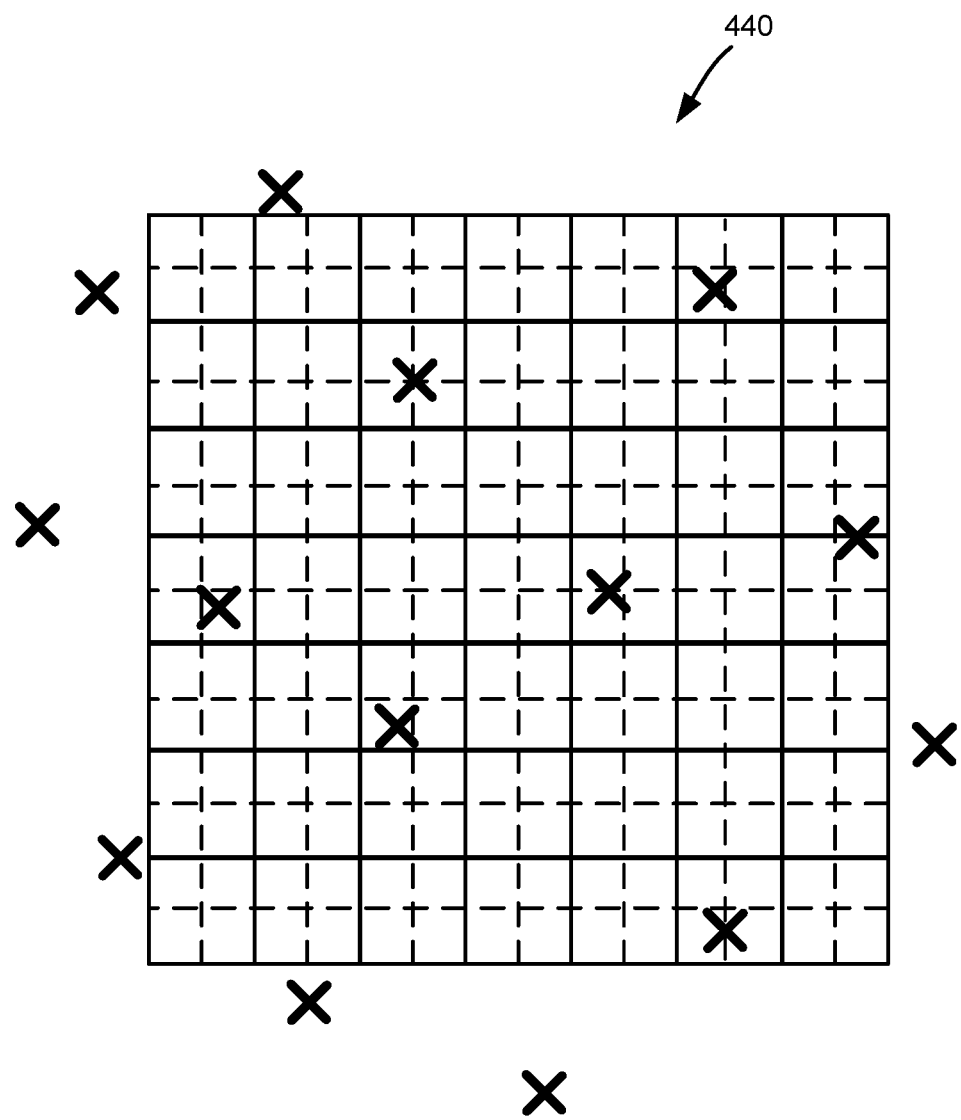
FIG. 4 is a representation of how dot intensity may be used to determine a projected dot's position and corresponding depth at a sub-pixel level, according to one or more example implementations.

As can be seen in FIG. 3, a feature for this dot pattern is the dot peak intensity location. This can be estimated to within sub-pixel accuracy. More particularly, as represented in FIG. 4, the X-shaped crosses represent the estimated dot centers, with the pixels are divided into sub-pixels by the dashed lines, providing a finer grid 440. Each estimated center corresponds to a sub-pixel. The centers of some additional pixels outside the exemplified grid (e.g., the grid may be part of a larger image) are also shown, and will be described below with reference to FIG. 5.

Note that FIG. 4 subdivides the pixels into 2×2 sub-pixels to double the resolution. However instead of double sub-pixel resolution, even higher resolution may be obtained by subdividing the pixels further, e.g., into nine sub-pixels each, sixteen sub-pixels each and so on; (non-square subdivision may be used as well).

Figure 5:
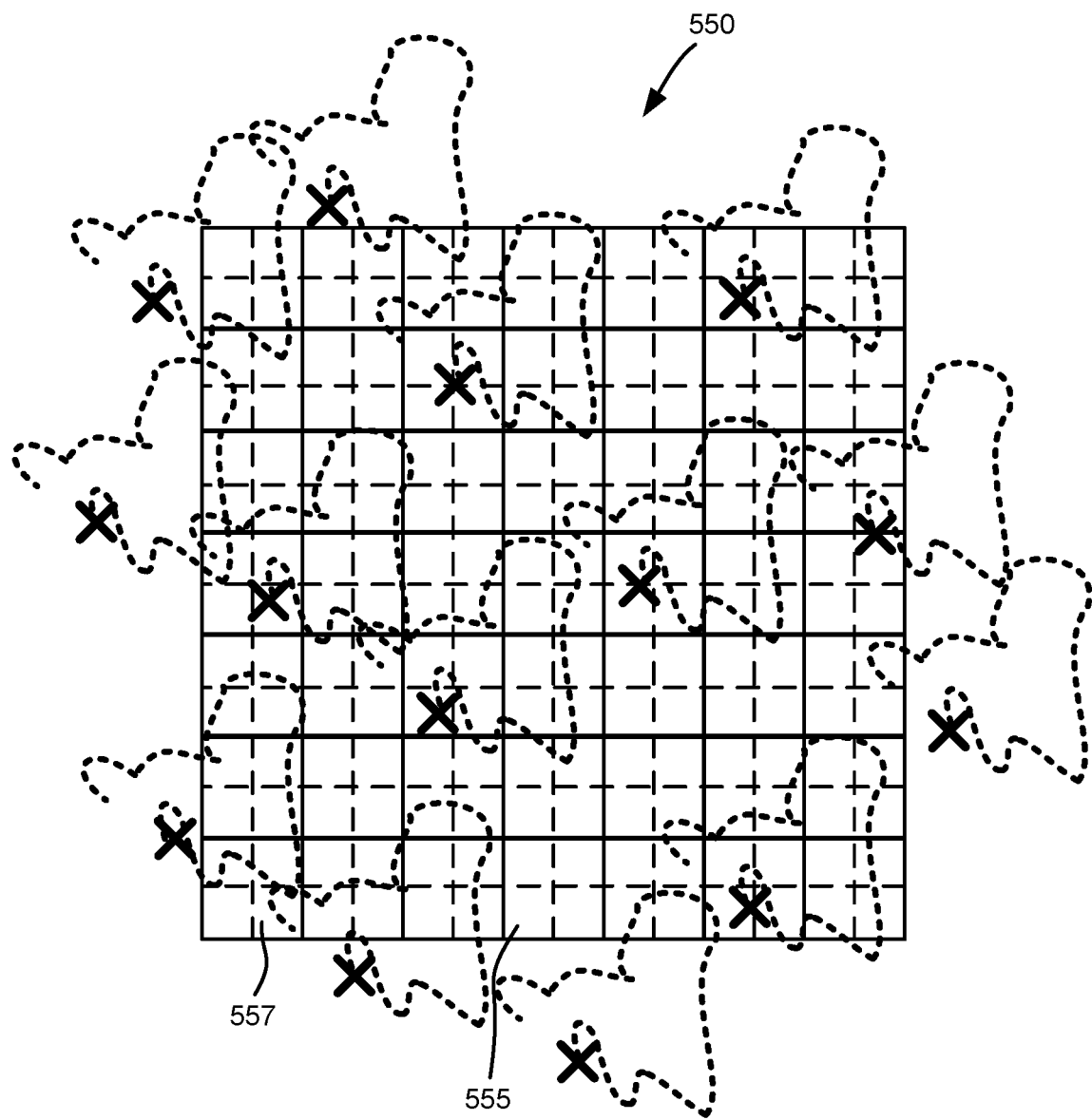
FIG. 5 is a representation of how a projected dot's position moves over time via moving a projector, for determining dot intensity at sub-pixel locations, according to one or more example implementations.

As shown in FIG. 5, (which represents a grid 550 corresponding to the grid 440 of FIG. 4 over a period of time), the dots, represented by the X-shaped crosses to show their center, may be moved by moving the projector, e.g., vibrating the projector 106 via the motion mechanism 114 of FIGS. 1 and 2. The dot/feature movement in this example is along the feature paths represented by the dotted lines.

Because of the movement over time, as captured in a sequence (set) of image frames, far more sub-pixels are illuminated (over the set of frames) by any given projected dot than without movement of that dot. Note that the paths in FIG. 5 are not intended to convey any frame rate of capturing the dots, nor any frequency of vibrating the projector, but in general the movement and frame rate may be such that most if not all of the path is captured for each sub-pixel encountered. Further note that via the movement, the dots that were not within the exemplified grid initially but nearby may be projected into the grid at some point, while some of those in the grid leave it at some point (to illuminate other sub-pixels in the larger image, for example).

As mentioned above, it may be beneficial to intentionally project a dot pattern that is slightly larger than the scene (as exemplified in FIG. 2). For example, consider that the grid represents a corner of a larger image or is along an edge of a larger image. If the projected dot pattern area is slightly larger than the scene, it can be seen that over time the movement illuminates some sub-pixels with dots that were previously outside the scene (and would continue to miss the scene if stationary).

In general, the movement is generally arbitrary/unpredictable for a given implementation. Notwithstanding, the amount of movement and vibration frequency may be controlled (or calibrated in a fixed system) relative to the frame rate of capturing the images and/or the dot density so that the benefits of the moving dots are obtained and made closer to optimal, e.g., the feature path traverses as many sub-pixels as possible and the frame rate is such that all or most of traversal is captured.

As can be readily appreciated, the super-resolution of depth for a stationary scene (or one with slow movement relative to the camera frame rate and vibration frequency) can be determined by combining the depth/disparity maps computed from a set of images taken over time. While some depth data may still be missing (e.g., the entire pixel 555 was not touched by a dot center, nor are other pixels and sub-pixels represented in FIG. 5), the amount of feature data captured for sub-pixels is significantly greater than without movement. Indeed, the benefit of dot movement can be seen even without dividing pixels to the sub-pixel level.

Figure 6:
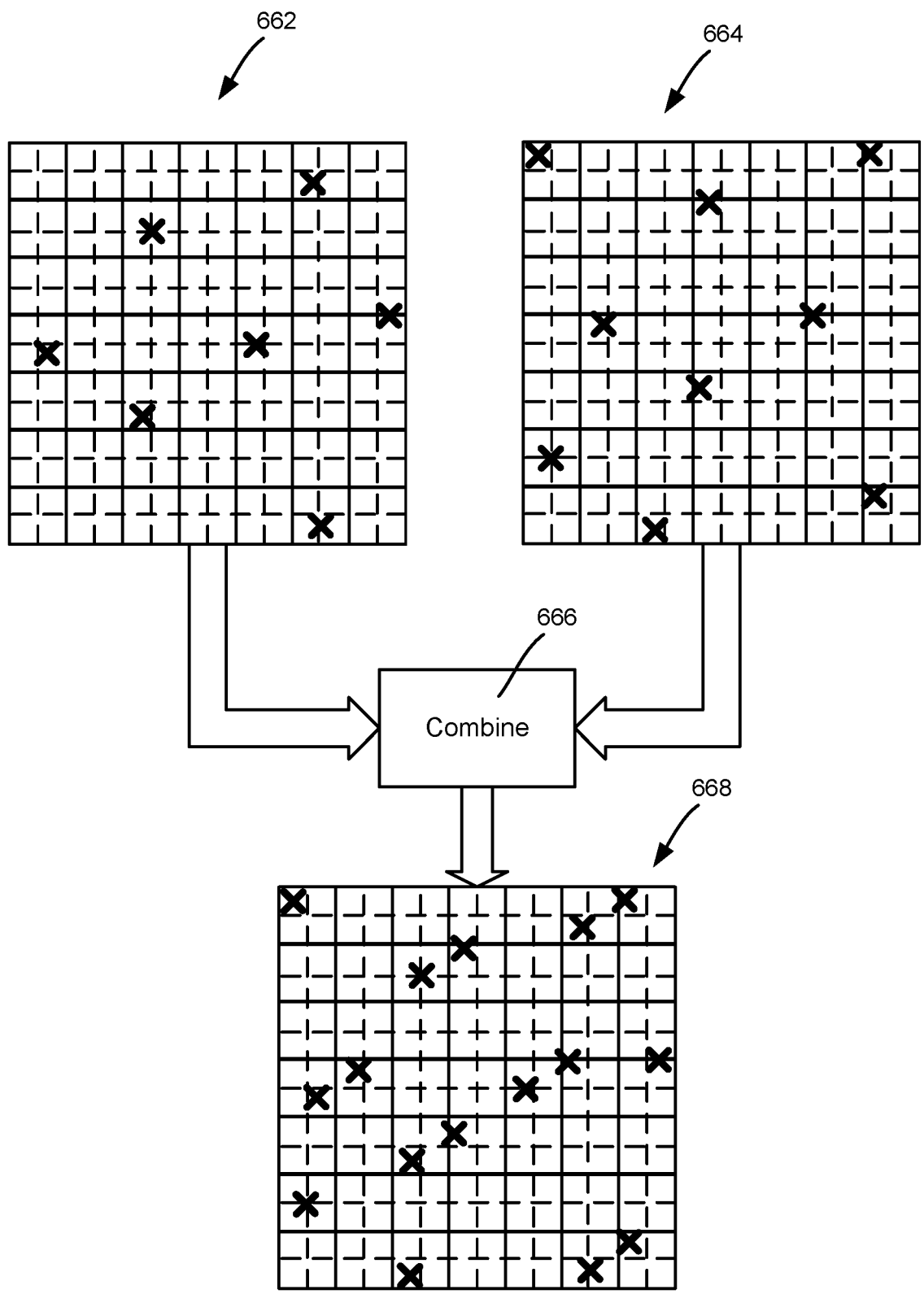
FIG. 6 is a representation of how dot feature data or depth data captured at different times may be combined into merged data, according to one or more example implementations.

Combining the images to effectively increase dot density is represented in FIG. 6, where the features (or computed depth data) of two grids (frames) 662 and 664 may be combined (block 666) into a merged grid 668. Note that the feature descriptors of different image frames may be combined/merged, or the depth values first computed for the feature descriptors, with the depth values combined/merged. Further note that in FIG. 6, the image frames are not necessarily consecutive (but may be); the dots may not have moved as much as depicted in two consecutive images depending on the speed of movement versus the camera frame rate.

In any event, it is seen that seven sub-pixels are in the feature path (or have depth data) as captured in the example frame 662, and nine sub-pixels are in the feature path as captured in the other, e.g., later frame 664; (some additional sub-pixels moved in from outside the grid 664).

Combining the grids 662 and 664 results in the merged grid 668 having sixteen sub-pixels that were illuminated over time. As can be readily appreciated, the two frames 662 and 664 illustrate the principle, however typically more than two images are combined, up to any practical number depending on how many frames can be captured before a super-resolved depth map is desired. Thus, coverage/merged dot density may be increased significantly.

For a given set of image frames over time, wherever the feature path passed through the higher resolution sub-pixel, the depth is directly computed for that sub-pixel. For each sub-pixel that is not in the path, depth information from the stereo capture at the original resolution and/or depth information from nearby super-resolved sub-pixel depth may be combined to estimate a depth for that sub-pixel. A straightforward way this may be accomplished is via push/pull interpolation, e.g., based on only the super-resolved depth information, which are well-known techniques in other areas of pixel processing. Note however that far less missing information needs to be estimated (e.g., interpolated).

The above description is applicable to stationary scenes, (or scenes with slow depth changes relative to the frame rate and feature path). For a scene with moving objects, tracking may be performed to transfer information across different time frames, e.g., using known techniques such as deformable ICP (iterative closest point) solutions. Note that the projector and camera may be moved to change depth instead of or in addition to a scene, e.g., the image capturing system or subsystem may be attached to a robot, mounted to a camera dolly, and so forth.

Figure 7:
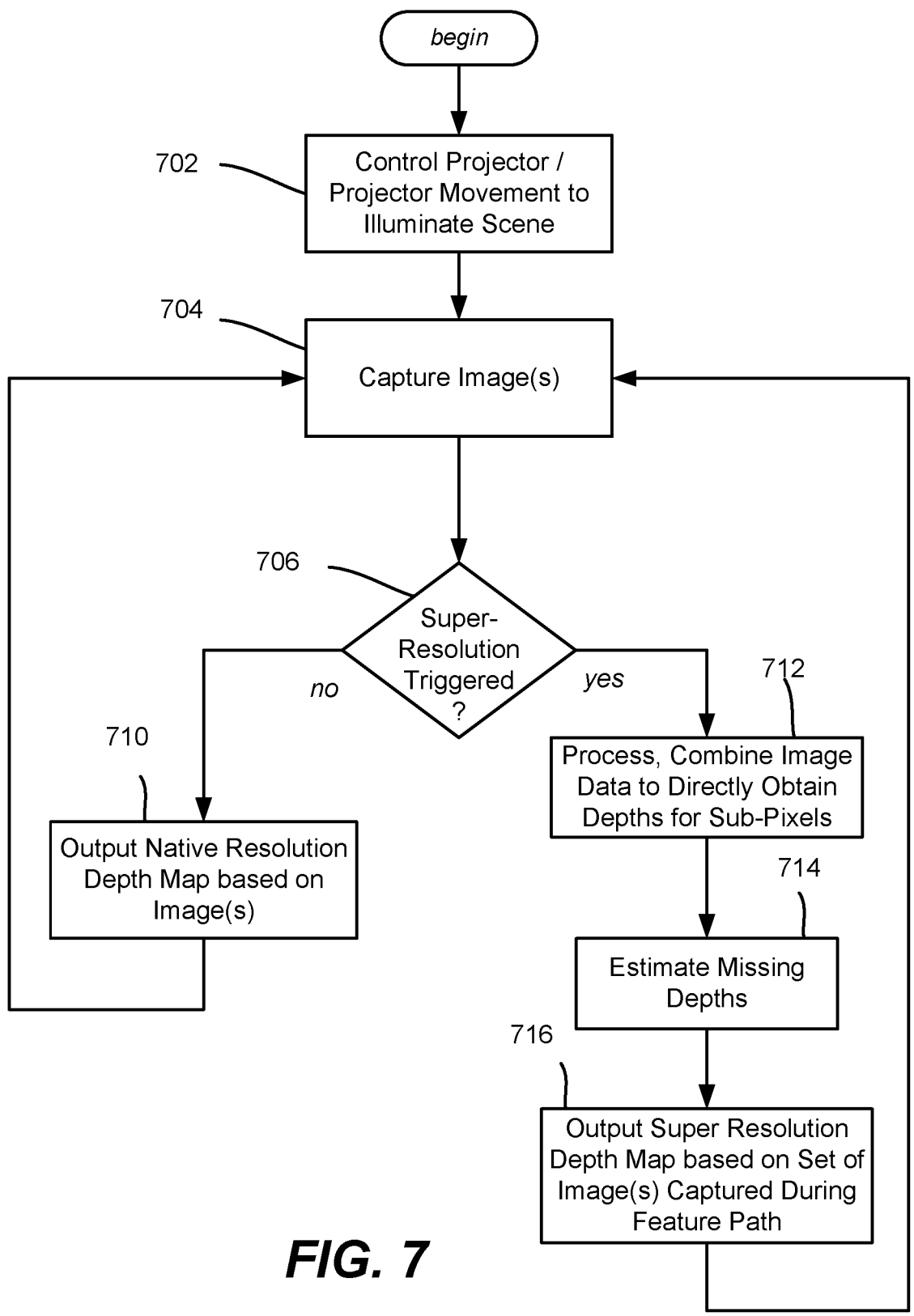
FIG. 7 is a flow diagram representing example steps that may be taken to obtain a super-resolved depth map, according to one or more example implementations.

FIG. 7 summarizes some of the concepts described herein using example steps in a flow diagram, beginning at step 702 where the projector is controlled, which may be as simple as turning it on/removing it from an energy saving mode, or a more complex operation, such as adjusting dot pattern distribution, density, area of coverage, and/or adjusting motor vibration frequency, duty cycle, and/or amplitude, such as to adjust for a scenario/camera rate.

Step 704 captures the image or images. For brevity, stereo images are used hereafter in the description of FIG. 7. As the processing is likely faster than the frame rate, there may be a frame rate delay inherent in step 704; some processing or pre-processing may occur in parallel with the image capture.

Step 706 evaluates whether some criterion is met that triggers a super-resolution computation. For example, some number of frames (corresponding to an amount of time with a given frame rate) may trigger the super-resolution computation. In general, the feature path will be completed at some time and start repeating over the same sub-pixels, although not necessarily exactly; this completion time may be used to determine a trigger time. Alternatively, some amount of image processing may be done on existing images to determine whether a suitable coverage area in terms of the feature path hitting sub-pixels may be used, e.g., at a high enough percentage. If this alternative is used, time or number of frames may be used as a secondary trigger in case the path is such that it takes too long to reach sufficient coverage due to too much repetition.

Further, such image pre-processing may be used to vary the projector or projector movement in some way. For example, if the pattern is not providing desired coverage, the pattern density may be increased (if not fixed), the vibration frequency, duty cycle and/or amplitude may be changed, and so forth. Note that the use of two or more motors (e.g., piezoelectric motors) may be used to change the shapes of vibration-induced feature paths as well, (as exemplified by Lissajous figures).

Returning to step 706, if not triggered, a conventional depth map may be estimated and output via step 710, e.g., at the native resolution based on the last images captured and processed. The process then returns to step 704 to capture the next set of images. Note that as described above, it is alternatively feasible to return to step 702 if a change to the projector/movement is possible and appropriate, such as because the feature paths are not attaining sufficient sub-pixel coverage.

If at step 706 the super-resolution computation is triggered, step 712 combines the images to obtain feature data for as many sub-pixels as reached by the feature path. Part of the sub-pixel estimation and combination of images/depths may be ongoing as each new image set is captured rather than only when triggered (e.g., at least part of step 712 may be performed before step 706), whereby step 712 may only needs to process and combine the latest image set/depth data to complete the super-resolved depth map. Note that in the event of a conflict where a sub-pixel has been reached more than once, (e.g., the sub-pixel 557 in FIG. 5), the most recent feature descriptor(s) may be used. Alternatively, other conflict resolution may be used, e.g., discarding what appears to be the noisier value, averaging, and so on may be used instead.

At step 714, any missing sub-pixels are estimated, e.g., via interpolation. The super-high resolution depth map is output at step 716, and the process repeated.

Note that while the examples herein are generally directed towards a stereo camera system, a single camera may similarly benefit from the technology described herein. Indeed, depth maps obtained via a single camera and projected light are well known; vibrating the projector likewise provides for more pixels or sub-pixels being illuminated, providing for more accurate native resolution depth maps or super-resolution depth maps. Time-of-flight depth sensing may also benefit from having more parts of an object being illuminated by vibrating the light source.

Example Operating Environment

It can be readily appreciated that the above-described implementation and its alternatives may be implemented on any suitable computing device, including a gaming system, personal computer, tablet, DVR, set-top box, smartphone and/or the like. Combinations of such devices are also feasible when multiple such devices are linked together. For purposes of description, a gaming (including media) system is described as one exemplary operating environment hereinafter.

Figure 8:
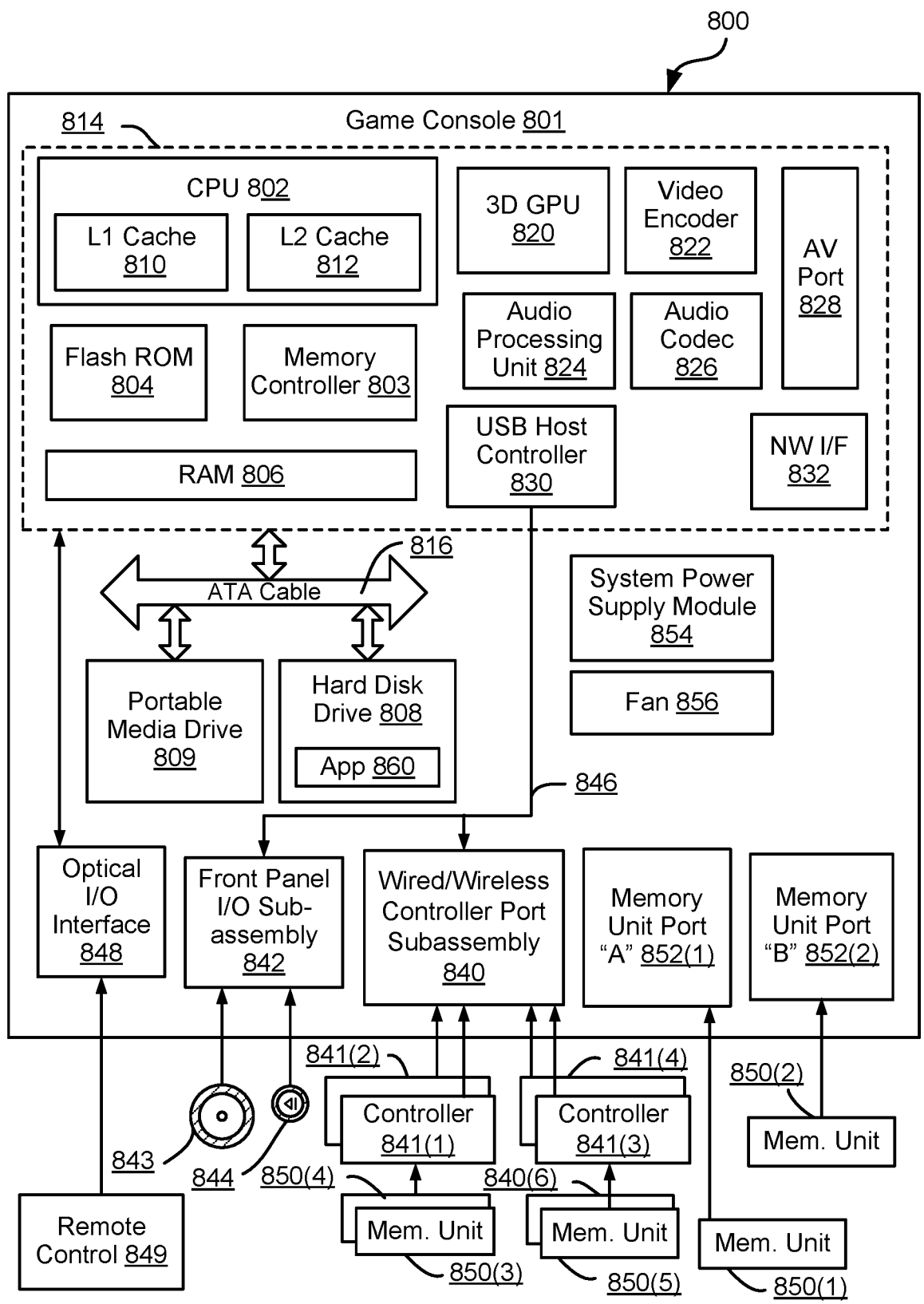
FIG. 8 is a block diagram representing an exemplary non-limiting computing system or operating environment, in the form of a gaming system, into which one or more aspects of various embodiments described herein can be implemented.

FIG. 8 is a functional block diagram of an example gaming and media system 800 and shows functional components in more detail. Console 801 has a central processing unit (CPU) 802, and a memory controller 803 that facilitates processor access to various types of memory, including a flash Read Only Memory (ROM) 804, a Random Access Memory (RAM) 806, a hard disk drive 808, and portable media drive 809. In one implementation, the CPU 802 includes a level 1 cache 810, and a level 2 cache 812 to temporarily store data and hence reduce the number of memory access cycles made to the hard drive, thereby improving processing speed and throughput.

The CPU 802, the memory controller 803, and various memory devices are interconnected via one or more buses (not shown). The details of the bus that is used in this implementation are not particularly relevant to understanding the subject matter of interest being discussed herein. However, it will be understood that such a bus may include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, the CPU 802, the memory controller 803, the ROM 804, and the RAM 806 are integrated onto a common module 814. In this implementation, the ROM 804 is configured as a flash ROM that is connected to the memory controller 803 via a Peripheral Component Interconnect (PCI) bus or the like and a ROM bus or the like (neither of which are shown). The RAM 806 may be configured as multiple Double Data Rate Synchronous Dynamic RAM (DDR SDRAM) modules that are independently controlled by the memory controller 803 via separate buses (not shown). The hard disk drive 808 and the portable media drive 809 are shown connected to the memory controller 803 via the PCI bus and an AT Attachment (ATA) bus 816. However, in other implementations, dedicated data bus structures of different types can also be applied in the alternative.

A three-dimensional graphics processing unit 820 and a video encoder 822 form a video processing pipeline for high speed and high resolution (e.g., High Definition) graphics processing. Data are carried from the graphics processing unit 820 to the video encoder 822 via a digital video bus (not shown). An audio processing unit 824 and an audio codec (coder/decoder) 826 form a corresponding audio processing pipeline for multi-channel audio processing of various digital audio formats. Audio data are carried between the audio processing unit 824 and the audio codec 826 via a communication link (not shown). The video and audio processing pipelines output data to an A/V (audio/video) port 828 for transmission to a television or other display/speakers. In the illustrated implementation, the video and audio processing components 820, 822, 824, 826 and 828 are mounted on the module 814.

FIG. 8 shows the module 814 including a USB host controller 830 and a network interface (NW I/F) 832, which may include wired and/or wireless components. The USB host controller 830 is shown in communication with the CPU 802 and the memory controller 803 via a bus (e.g., PCI bus) and serves as host for peripheral controllers 834. The network interface 832 provides access to a network (e.g., Internet, home network, etc.) and may be any of a wide variety of various wire or wireless interface components including an Ethernet card or interface module, a modem, a Bluetooth module, a cable modem, and the like.

In the example implementation depicted in FIG. 8, the console 801 includes a controller support subassembly 840, for supporting four game controllers 841(1)-841(4). The controller support subassembly 840 includes any hardware and software components needed to support wired and/or wireless operation with an external control device, such as for example, a media and game controller. A front panel I/O subassembly 842 supports the multiple functionalities of a power button 843, an eject button 844, as well as any other buttons and any LEDs (light emitting diodes) or other indicators exposed on the outer surface of the console 801. The subassemblies 840 and 842 are in communication with the module 814 via one or more cable assemblies 846 or the like. In other implementations, the console 801 can include additional controller subassemblies. The illustrated implementation also shows an optical I/O interface 848 that is configured to send and receive signals (e.g., from a remote control 849) that can be communicated to the module 814.

Memory units (MUs) 850(1) and 850(2) are illustrated as being connectable to MU ports "A" 852(1) and "B" 852(2), respectively. Each MU 850 offers additional storage on which games, game parameters, and other data may be stored. In some implementations, the other data can include one or more of a digital game component, an executable gaming application, an instruction set for expanding a gaming application, and a media file. When inserted into the console 801, each MU 850 can be accessed by the memory controller 803.

A system power supply module 854 provides power to the components of the gaming system 800. A fan 856 cools the circuitry within the console 801.

An application 860 comprising machine instructions is typically stored on the hard disk drive 808. When the console 801 is powered on, various portions of the application 860 are loaded into the RAM 806, and/or the caches 810 and 812, for execution on the CPU 802. In general, the application 860 can include one or more program modules for performing various display functions, such as controlling dialog screens for presentation on a display (e.g., high definition monitor), controlling transactions based on user inputs and controlling data transmission and reception between the console 801 and externally connected devices.

The gaming system 800 may be operated as a standalone system by connecting the system to high definition monitor, a television, a video projector, or other display device. In this standalone mode, the gaming system 800 enables one or more players to play games, or enjoy digital media, e.g., by watching movies, or listening to music. However, with the integration of broadband connectivity made available through the network interface 832, gaming system 800 may further be operated as a participating component in a larger network gaming community or system.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method for computing a depth map having a higher resolution than a resolution of each sensor of a sensor set, the method comprising;
    vibrating a projector;
    projecting, while the projector is vibrating, a pattern of light comprising a plurality of dots into a scene, the pattern of light moving based on the vibrating;
    capturing a plurality of images at different times via the sensor set while the projector is vibrating, the sensor set comprising at least two synchronized sensors, wherein a frequency of the vibrating is relative to a frame rate of capturing the plurality of images;
    processing at least some of the images to obtain computed depth data; and
    outputting a depth map comprising the depth data.

2. The method of claim 1, wherein the sensor set comprises a plurality of stereo cameras, and wherein processing at least some of the images to obtain the computed depth data comprises using disparity data indicative of differences between stereo images.

3. The method of claim 1, wherein the dots of the pattern of light are projected to a region that is larger than the scene.

4. The method of claim 1, wherein projecting the moving pattern of light further comprises projecting at least one of a line pattern, color codes, corners, or other distinct shapes into the scene.

5. The method of claim 1, wherein a frequency of the vibrating is relative to a frame rate of capturing the plurality of images and a density of the plurality of dots.

6. The method of claim 1, wherein the processing comprises processing at least some of the images to obtain computed depth data for sub-pixels based upon which sub-pixel locations were in a path corresponding to the moving pattern of light.

7. The method of claim 1, further comprising projecting part of the moving pattern outside the scene to provide for movement into the scene resulting from the vibrating.

8. A system comprising:
    a projector configured to vibrate and project a light pattern comprising a plurality of dots towards a scene while the projector is vibrating;
    a sensor set comprising at least two synchronized sensors configured to sense light from the light pattern that is reflected from the scene while the projector is vibrating;
    a motion device coupled to the projector to move the light pattern over time while the projector is vibrating; and
    an image processor for processing a plurality of images captured over time while the projector is vibrating in which the light pattern has moved within the plurality of images to compute a depth map, wherein a frequency of the vibrating is relative to a frame rate of capturing the plurality of images.

9. The system of claim 8, wherein the image processor is configured to compute the depth map at a sub-pixel resolution that is higher than a native resolution of the sensor set.

10. The system of claim 8, wherein the motion device comprises at least one motor.

11. The system of claim 8, wherein the sensor set and the projector are incorporated into a single device.

12. The system of claim 8, wherein a frequency of the vibrating is relative to a frame rate of capturing the plurality of images and a density of the plurality of dots.

13. One or more computer-readable storage media comprising computer-executable instruction for computing a depth map having a higher resolution than a resolution of each sensor of a sensor set, the computer-executable instruction causing one or more processors to perform operations comprising:
   vibrating a pattern of light projected from a projector, the pattern of light comprising a plurality of dots into a scene, the pattern of light moving based on the vibrating;
   capturing a plurality of images at different times via the sensor set while the pattern of light is vibrating, the sensor set comprising at least two synchronized sensors, wherein a frequency of the vibrating is relative to a frame rate of capturing the plurality of images;
   processing at least some of the images to obtain computed depth data; and
   outputting a depth map comprising the depth data.

14. The one or more computer-readable storage media of claim 13, wherein the sensor set comprises a plurality of stereo cameras, and wherein processing at least some of the images to obtain the computed depth data comprises using disparity data indicative of differences between stereo images.

15. The one or more computer-readable storage media of claim 13, wherein vibrating the light pattern comprising projecting the light pattern into a mirror that is vibrated.

16. The one or more computer-readable storage media of claim 13, wherein vibrating the light pattern comprises vibrating the projector.

17. The one or more computer-readable storage media of claim 13, wherein projecting the moving pattern of light comprises projecting the plurality of dots into the scene.

18. The one or more computer-readable storage media of claim 13, wherein a frequency of the vibrating is relative to a frame rate of capturing the plurality of images and a density of the plurality of dots.

19. The one or more computer-readable storage media of claim 13, wherein the computer-executable instructions further cause the one or more processors to perform operations comprising projecting part of the pattern outside the scene to provide for movement into the scene resulting from the vibrating.

20. The one or more computer-readable storage media of claim 13, wherein the processing further comprises processing at least some of the images to obtain computed depth data for sub-pixels based upon which sub-pixel locations were in a path corresponding to the moving pattern of light, and wherein outputting the depth map further comprises outputting the depth map comprising the depth data for each sub-pixel.

* * * * *